(12) United States Patent
Blacquiere et al.

(10) Patent No.: US 7,813,624 B2
(45) Date of Patent: Oct. 12, 2010

(54) APPARATUS FOR AND METHOD OF RECORDING DIGITAL AUDIO/VIDEO SIGNALS

(75) Inventors: Johannis Friso Rendert Blacquiere, Eindhoven (NL); Pope Ijtsma, Eindhoven (NL); Dirk Hamelinck, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 974 days.

(21) Appl. No.: 10/564,533

(22) PCT Filed: Jul. 8, 2004

(86) PCT No.: PCT/IB2004/051169
§ 371 (c)(1),
(2), (4) Date: Jan. 12, 2006

(87) PCT Pub. No.: WO2005/008660
PCT Pub. Date: Jan. 27, 2005

(65) Prior Publication Data
US 2006/0171279 A1    Aug. 3, 2006

(30) Foreign Application Priority Data
Jul. 17, 2003    (EP)    ................... 03102207

(51) Int. Cl.
*H04N 5/00* (2006.01)
(52) U.S. Cl. ........................................ 386/125; 386/95
(58) Field of Classification Search ................ 386/125, 386/95
See application file for complete search history.

(56) References Cited

U.S. PATENT DOCUMENTS

| | | | |
|---|---|---|---|
| 2001/0038704 A1 | 11/2001 | Ito et al. | |
| 2002/0136537 A1* | 9/2002 | Takahashi | ..................... 386/95 |
| 2003/0031106 A1 | 2/2003 | Ozaki | |

FOREIGN PATENT DOCUMENTS

| | | |
|---|---|---|
| EP | 0 730 274 A2 | 9/1996 |
| EP | 0730274 A2 | 9/1996 |
| EP | 0798714 A2 | 10/1997 |
| WO | 0122416 A1 | 3/2001 |
| WO | 02086729 A2 | 10/2002 |
| WO | 03012780 A2 | 2/2003 |

OTHER PUBLICATIONS

GCC C++—GNU Project C. and C++ Compiler.
ISR for Publication, International Publication No. W02005/008660.
GCC C++ - GNU Project C. and C++Compiler, Publication date Jun. 16, 1995.

* cited by examiner

*Primary Examiner*—Marsha D Banks Harold
*Assistant Examiner*—Daniel Tekle

(57) ABSTRACT

A recording apparatus for recording digital audio/video signals on a removable rewritable disc like recording medium has been proposed. The apparatus comprises writing means (21, 22, 25) for recording the digital information signals and control means (20) for controlling the recording. The apparatus is capable of performing initialization, formatting and defect management of a rewritable medium. Further, the apparatus is capable of storing data in replacement areas instead of defect areas, which have been determined to be defective according to rules of the defect management. The control means (20) are adapted to re-record data from the replacement areas in the defect areas in order to improve playability of digital audio/video signals stored on the medium.

14 Claims, 3 Drawing Sheets

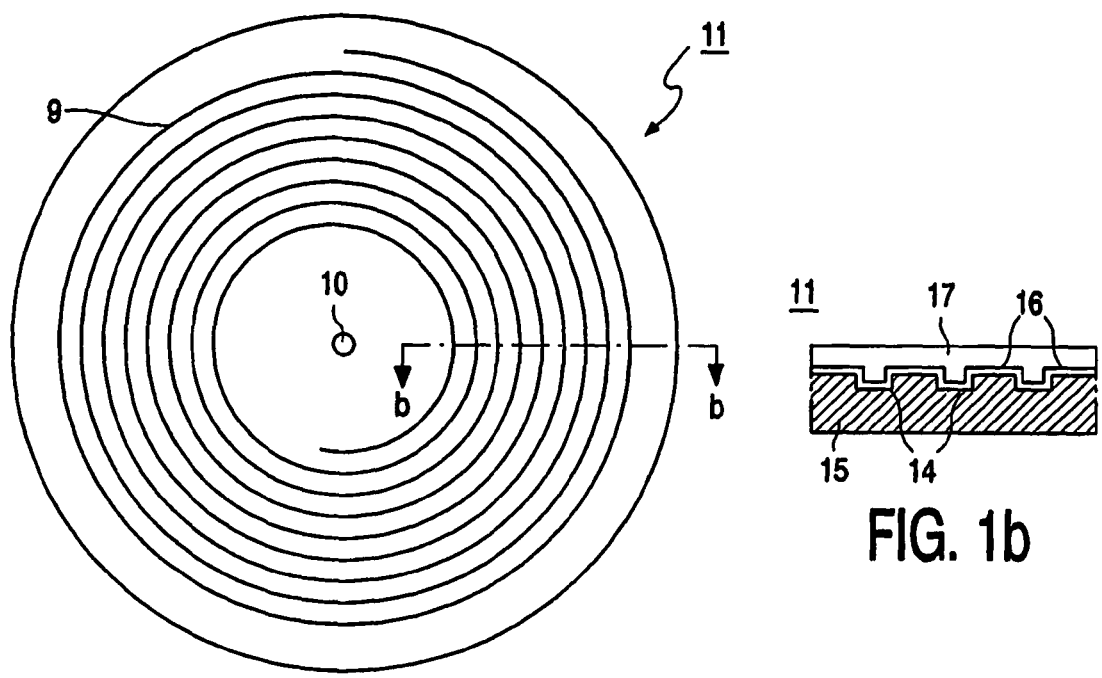
FIG. 1a
FIG. 1b
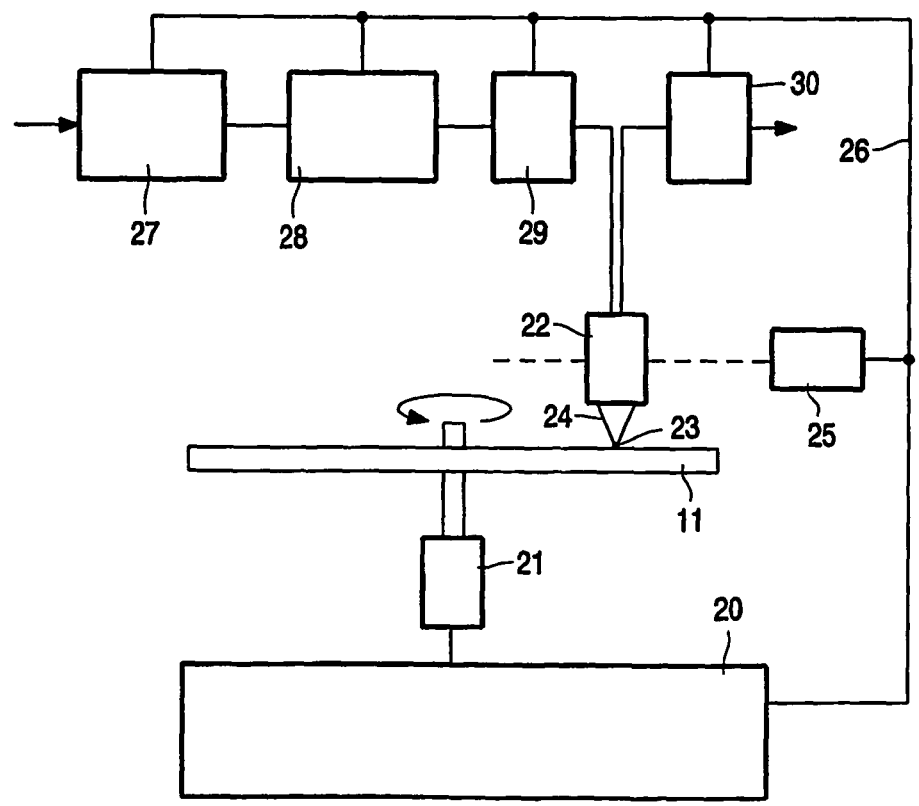
FIG. 2

APPARATUS FOR AND METHOD OF RECORDING DIGITAL AUDIO/VIDEO SIGNALS

The invention relates to a recording apparatus for recording digital audio/video signals on a removable rewritable disc like recording medium, the medium comprising a user area comprising user data represented by the digital audio/video signals, a table area comprising a defect table, the defect table comprising a list of addresses of defect areas in the user area and corresponding replacement areas on the medium, the defect areas identified as defective according to predefined defect management rules, the recording apparatus comprising input means for receiving the digital audio/video signals;

recording means for recording the digital audio/video signals on the medium;

reading means for reading digital audio/video signals recorded on the medium;

output means for outputting the digital audio/video signals read; and control means for controlling recording the digital audio/video signals.

The invention further relates to a reading apparatus for reading digital audio/video signals from a removable rewritable disc like recording medium, the medium comprising a user area comprising user data represented by the digital audio/video signals, a table comprising a defect table, the defect table comprising a list of addresses of defect areas in the user area and corresponding replacement areas on the medium, the reading apparatus comprising reading means for reading digital audio/video signals recorded on the medium;

output means for outputting the digital audio/video signals read; and control means for controlling reading the digital audio/video signals.

The invention also relates to a method of arranging digital audio/video signals on a removable rewritable disc like recording medium, the medium comprising a user area comprising user data represented by the digital audio/video signals, a table area comprising a defect table, the defect table comprising a list of addresses of defect areas in the user area and corresponding replacement areas on the medium, the defect areas identified as defective according to predefined defect management rules.

In addition, the invention relates to a method of reading digital audio/video signals from a removable rewritable disc like recording medium, the medium comprising a user area comprising user data represented by the digital audio/video signals, a table area comprising a defect table, the defect table comprising a list of addresses of defect areas in the user area and corresponding replacement areas on the medium, the method comprising steps of reading the digital audio/video signals from the recording medium and outputting the digital audio/video signals read for processing.

Further, the invention relates to a computer data system comprising a computer connected to a recording apparatus for recording digital audio/video signals on a removable rewritable disc like recording medium, the medium comprising a user area comprising user data represented by the digital audio/video signals, a table area for recording a defect table comprising a list of addresses of defect areas in the user area and corresponding replacement areas on the medium, the defect areas identified as defective according to predefined defect management rules, the recording apparatus comprising input means connected to the computer for receiving the digital audio/video signals;

recording means for recording the digital audio/video signals on the medium;

reading means for reading digital audio/video signals recorded on the medium;

output means for outputting the digital audio/video signals read to the computer; and control means for controlling recording the digital audio/video signals.

The invention also relates to a computer program product for arranging digital audio/video signals on a removable rewritable disc like recording medium.

Recording media like optical discs (DVD+RW, Blu-Ray, etc.) are capable of storing large amount of data of different types. They can be used in different environments having specific requirements as for organization of data on a recording medium. Typically, data are organized into files in accordance with rules of a particular file system. Such file system has its own file system data, which include information about all kind of structures relating to data stored on a recording medium. In particular, file system data may include volume structures representing the structures of logical and/or physical volumes, file structures representing the structures of files containing the data, directory structures describing grouping of files, and a space bitmap representing allocated or unallocated space for storing data on a recording medium. A recording medium may comprise addressable recording units (blocks) for storing the data. At a level of a file system those units are referenced to with use of logical addresses defining addressing space. Partitioning of a recording medium allocates a space on the medium for storing data under control (according to rules) of a file system.

At present, for example, DVD+RW discs are in use by Consumer Electronics (CE) devices and in the Personal Computer (PC) environment. In the CE environment DVD+RW discs are used mainly for recording digital video information according to a format of DVD Video Recording, commonly reffered to as DVD+VR. This means that there are defined specific allocation rules and set of files containing the video information itself and information about that video information such as title information, menu structures, etc. For example, in the DVD+VR format some files start at fixed addresses. Next to that, the (predefined) list of files has to be physically on a medium in a certain order.

The PC environment is based on a different philosophy. There are, in principle, no allocation requirements. Specific applications may require some files to be present in a certain directory and applications will typically have their own data format to store information in files or to retrieve information from a file. This means that as long as there is free space available on a medium it is possible to add data files to that medium from all kinds of different applications. As an example, on a single disc there could be multi-media files, text files and executable files all mixed with each other.

Recently, more and more CE devices, like video players/recorders, have capability to seek through the file system information on the disc for files of a certain type that they can handle as well. Example of this are (mainly) JPEG files and also, already more and more, MP3 files. In the future possibly more types of multi-media files will be supported in the CE world. Next to that, also new standards on meta-data are created (such as e.g. MPV or HighMAT) designed to make it easier to move digital content between PCs and home electronics devices, e.g. by providing a common "look and feel" in different environments.

The published international patent application WO 01/22416 A1 discloses the recording apparatus capable of performing initialization, formatting and defect management of a rewritable medium such as a CD-RW disc. This is done to facilitate the use of CD-RW as a high-capacity floppy disc, so immediate writing or reading of files is possible. Such media are commonly referred to as Mount Rainier ReWritable (MRW) media, e.g. CD-MRW, DVD+MRW.

Further, said recording apparatus makes it possible to store file system data of different file systems on one recording medium, so-called "bridge medium". This facilitates sharing of the bridge medium between different environments, e.g. the CE environment and the PC environment. A special part of a recording medium, called a general application area (GAA), is allocated for storing file system data of a file system used by other devices not capable of performing the defect management in line with WO 01/22416 A1.

In the PC environment the most likely way of adding data to the bridge medium is by means of "drag-and-drop" technique. A user can then make the medium compatible with legacy players through the use of a compliance (bridge) application running on the PC. Basically, the application writes a second ("limited") file system data, called "CE-bridge", to the medium, using the suitable file system(s) and content pointers, such that a legacy "non-MRW" system can interpret these as content under its main file system. As a result, the CE-player will play the content that is referenced by this file system data, for which it has suitable content decoders.

Examples of data stored on DVD+MRW discs in the PC environment are video, photo or audio data. If any defects are detected on a disc, the defect management is applied. This could create a situation where some blocks of the playable multimedia content data are physically replaced to so-called Spare Area used by the defect management. In such a case, the data is still contiguous from a logical address point of view, however the data is not physically contiguous on the disc. Present DVD players and recorders in the CE environment do not have any MRW capabilities. This means that they are not capable of reading MRW remapping tables to find out which blocks have been remapped to the spare area. A further problem is caused by the fact that navigation through DVD video data in video players is not based on offsets within a file listed in the file system, but on so-called navigation packs, NAV-PACKs, with relative offsets to a certain point zero and other NAV-PACKs. Therefore, these present players and recorders will not follow the remapping, but will try to read the data from the defective location. When some of the content is remapped to the spare area, problems with playback in non-MRW devices will occur, as there is no valid information on locations expected by these devices and/or the devices will not be able to read the information correctly due to a defect. This will result in "hicks" or strong artifacts in the content-stream, noticeable to a user.

It is an object of the invention to improve playback of multimedia content recorded on a medium with use of a defect management.

This object is achieved, according to a first aspect of the invention, by a recording apparatus of the type described in the opening paragraph, characterized in that the control means are adapted to search the defect table for a replacement area address of a replacement area comprising the user data, to search the defect table for a defect area address of a defect area corresponding to the replacement area, to localize the replacement area according to the replacement area address, to localize the corresponding defect area according to the defect area address, to read the user data from the replacement area and to re-record the user data read in the defect area regardless of the defect management rules. This increases reliability of the content stored on the medium, as the defect area may contain good or partially good data after re-recording.

In an embodiment of the recording apparatus, the control means are adapted to collect re-recording information related to re-recording of the user data read in the defect area, to include the re-recording information in the defect table and to record the defect table in the table area. This embodiment is advantageous in that provides information, which can be used to optimize access to and management of the content stored on the medium.

In a further embodiment of the recording apparatus, the control means are adapted to read user data re-recorded in the defect area, to compare the user data read from the defect area with the user data read from the corresponding replacement area and to include results of comparing in the re-recording information. This provides a way of verifying how successful was the re-recording operation and makes it possible to use this information while accessing data on the medium.

In another embodiment of the recording apparatus, the control means are adapted to use status bits in the defect table to include the re-recording information in the defect table. This is efficient way of storing the information.

According to a second aspect of the invention a reading apparatus of the type described in the opening paragraph is provided characterized in that the control means are adapted to monitor a speed of outputting the digital audio/video signals read, to read the defect table from the medium, to search the defect table for a replacement area address of a replacement area comprising the user data, to search the defect table for a defect area address of a defect area corresponding to the replacement area and to read the user data either from the replacement area or from the defect area corresponding to the replacement area in dependence on monitoring and speed requirements for the speed of outputting the digital audio/video signals read. This allows for optimizing the read-out of data from the medium.

It is advantageous, if the control means of the reading apparatus are adapted to read the user data either from the replacement area or from the defect area in dependence on a re-recording information related to the user data in the defect area and the replacement area, the re-recording information comprised in the defect table. This further improves the read-out of the data.

According to a third aspect of the invention a method of arranging digital audio/video signals on a removable rewritable disc like recording medium of the type described in the opening paragraph is provided characterized by searching the defect table for a replacement area address of a replacement area comprising the user data;

searching the defect table for a defect area address of a defect area corresponding to the replacement area;

localizing the replacement area according to the replacement area address;

localizing the corresponding defect area according to the defect area address;

reading the user data from the replacement area;

re-recording the user data read in the defect area regardless of the defect management rules.

According to a forth aspect of the invention a method of reading digital audio/video signals from a removable rewritable disc like recording medium of the type described in the opening paragraph is provided characterized by monitoring a speed of outputting of the digital audio/video signals read;

reading the defect table from the medium;

searching the defect table for a replacement area address of a replacement area comprising the user data;

searching the defect table for a defect area address of a defect area corresponding to the replacement area;

reading the user data either from the replacement area or from the defect area corresponding to the replacement area in dependence on the monitoring and speed requirements for the speed of outputting of the digital audio/video signals read.

According to a fifth aspect of the invention a computer data system of the type described in the opening paragraph is provided, characterized in that the computer is adapted to control the control means of the recording apparatus to perform the method as described in relation to the third aspect of the invention.

According to a sixth aspect of the invention a computer program product for recording digital information signals is provided, which program is operative to cause a processor to perform the method as described in relation to the third aspect of the invention.

These and other aspects of the invention will be apparent from and elucidated further with reference to the embodiments described by way of example in the following description and with reference to the accompanying drawings, in which:

FIG. 1a shows a recording medium (top view),

FIG. 1b shows a recording medium (cross section),

FIG. 2 shows a recording apparatus, in accordance with the invention,

Corresponding elements in different Figures have identical reference numerals.

Figure 3A:
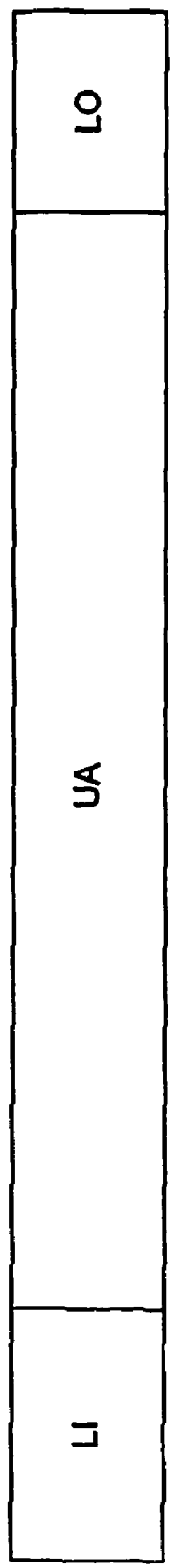
FIG. 3a shows a simplified layout of a non-MRW type of medium.

FIG. 1a shows an example of a recording medium 11 having a form of disc with a track 9 and a central hole 10. The track 9, being the position of the series of (to be) recorded marks representing digital information signals (data), is arranged in accordance with a spiral pattern of turns constituting substantially parallel tracks on an information layer. The recording medium may be optically readable, called an optical disc, and has an information layer of a recordable type. Examples of a recordable disc are the CD-RW, and writable versions of DVD, such as DVD+RW, and the high density writable optical disc using blue lasers, called Blu-ray Disc (BD). Digital information signals (data) are represented on the information layer by recording optically detectable marks along the track, e.g. crystalline or amorphous marks in phase change material. The track 9 on the recordable type of recording medium is indicated by a pre-embossed track structure provided during manufacture of the blank recording medium. The track structure is constituted, for example, by a pregroove 14, which enables a read/write head to follow the track during scanning. The track structure comprises position information, e.g. addresses, for indication the location of units of information, usually called information blocks or packets.

FIG. 1b is a cross-section taken along the line b-b of the recording medium 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

FIG. 2 shows a recording apparatus for recording digital information signals a recording medium 11 such as CD-RW, DVD+RW or BD, in accordance with the invention. The apparatus is provided with writing means for scanning the track on the recording medium, which means include a drive unit 21 for rotating the recording medium 11, a head 22, and a positioning unit 25 for coarsely positioning the head 22 in the radial direction on the track. The head 22 comprises an optical system of a known type for generating a radiation beam 24 guided through optical elements focused to a radiation spot 23 on a track of the information layer of the recording medium. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing digital information signals (data) the radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. For reading, the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the digital information signals (data). Hence retrieving means for reading information include the drive unit 21, the head 22, the positioning unit 25 and the read processing unit 30. The apparatus comprises write processing means for processing the input digital information signals (data) to generate a write signal to drive the head 22, which means comprise an input unit 27, and modulator means comprising a formatter 28 and a modulator 29. The input digital information signals (data) may comprise for example real-time video and/or audio data or still images data. The input unit 27 processes the input data to units of information, which are passed to the formatter 28 for adding control data and formatting the data, e.g. by adding error correction codes (ECC) and/or interleaving. For computer applications units of information may be interfaced to the formatter 28 directly—in such case, as an option, the input unit 27 does not have to be present in the apparatus. The formatted data from the output of the formatter 28 is passed to the modulation unit 29, which comprises for example a channel coder, for generating a modulated signal, which drives the head 22. Further the modulation unit 29 comprises synchronizing means for including synchronizing patterns in the modulated signal. The formatted units presented to the input of the modulation unit 29 comprise address information and are written to corresponding addressable locations on the recording medium under the control of control unit 20. Further, the apparatus comprises a control unit 20, which controls the recording and retrieving of information and may be arranged for receiving commands from a user or from a host computer. The control unit 20 is connected via control lines 26, e.g. a system bus, to said input unit 27, formatter 28 and modulator 29, to the read processing unit 30, and to the drive unit 21, and the positioning unit 25. The control unit 20 comprises control circuitry, for example a microprocessor, a program memory and control gates, for performing the procedures and functions according to the invention as described below. The control unit 20 may also be implemented as a state machine in logic circuits.

Figure 3B:
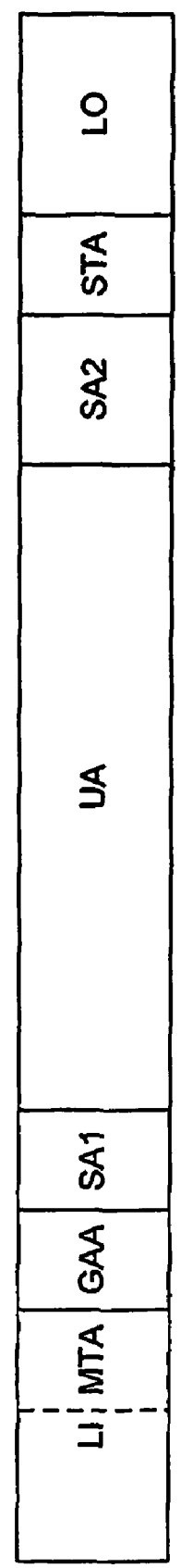
FIG. 3b shows a simplified layout of a MRW type of medium.

The control unit 20 is capable of performing initialization, formatting and defect management of a rewritable medium such as a DVD+RW disc. An example of simplified layout of such disc is shown in FIG. 3b. It comprises lead-in area LI, lead-out area LO, a general application area GAA, a spare area SA (in this example comprising two sub-areas SA1 and SA2), a user area UA, and table areas MTA and STA. LI and LO contain mainly media read/write definition and administration data. The user area UA is used mainly for recording of data used for real use and data related to content stored on a recording medium, such as user data and first file system data comprising directory and file entries pointing to the user data according to rules of a first file system. The general application area GAA can be used for storage of data that does not allow replacements by the defect management, such as application programs or device drivers that can handle defects, or file system data of additional file systems. The defect management is based on a main defect table MDT stored in a main table area MTA, a secondary defect table SDT stored in a secondary table area STA and replacement areas (packets) comprised in the spare area SA1, SA2. The secondary defect table is a copy of the main defect table; SDT contains the same information as MDT. STA is used as redundancy in case of issues with MTA, and for assuring that non-MRW PC-systems can use these tables for address remapper in order to logically construct the address space, compensating for the defect management reallocation (not interpretable by non-MRW drives). The main table area MTA is located within the lead-in area LI. Recording media with a layout of the type shown in FIG. 3b are commonly referred to as Mount Rainier ReWritable (MRW) media, e.g. CD-MRW or DVD+MRW, in contrast to "non-MRW" media with a layout as in example shown in FIG. 3a. In case of DVD+MRW recording media, GAA, SA1 and SA2 have a size of 2, 8 and 120 (or 504) MBytes, respectively.

Based on the MRW definitions, it is possible to ensure that MRW media can be read by non-MRW capable drives, by installing a remapping driver on the PC. This remapping driver can be obtained easily, amongst other, by using GAA, such that the file system in GAA launches an application, which installs this driver or downloads it from the Internet. For convergence with non-MRW aware CE devices, the same or a different file system, (typically ISO9660 or UDF) can be used for allowing addressing of the content typically recognized by CE devices. This is done by pointing to the multimedia content stored in UA of the MRW medium, using file system data stored in GAA, hereinafter also referred to as second file system data, known by CE devices. There can be an extra file system in GAA, dedicated to performing tasks related to the remapping driver.

The defect management employs predefined rules for determining defective areas in UA, for organizing spare areas on a medium, for defining circumstances under which data can be recorded/modified on the medium, generally, for controlling storing information on the medium. A defect table contains information, which can be used to perform the defect management. In particular, the defect table contains a list of defective areas (packets), which have been determined to be defective during verification or during use of the medium, according to rules of the defect management. For example, a particular area may be classified as a defective area, if reading data recorded in it gives errors. Further, the defect table contains a list of replacement areas (packets), reserved to be used as replacements of defective areas. Defective and replacement areas are referred to by their addresses on the medium. Different flags or status bits within the defect table indicate characteristics of those areas, e.g. usability for data recording. The defect table also contains information related to areas on the medium, where the defect management shall not be active, such as a size and position of GAA.

After recording of DVD compliant video in the PC environment, there are few actions required before the MRW disc can be played in the (legacy) CE environment, as described in the introductory part. These actions can be initiated automatically or via something like a "make convergent button" in a software application, or via a feature built inside the operating system functionality or via a user activated device function. The latter can be performed with help of a physical push button, a remote control, the user's voice or any other way the user may interact with the device.

The control unit 20 is adapted to search the defect table for a replacement area address of a replacement area comprising the user data, to search the defect table for a defect area address of a defect area corresponding to the replacement area, to localize the replacement area according to the replacement area address, to localize the corresponding defect area according to the defect area address, to read the user data from the replacement area and to re-record the user data read in the defect area regardless of the defect management rules. Hereinafter, re-recording means attempting to record data stored in the replacement area at the original, defective location. The control unit 20 can perform these steps automatically as a default background operation of the apparatus or in response to the user's request as described above.

Figure 4A:
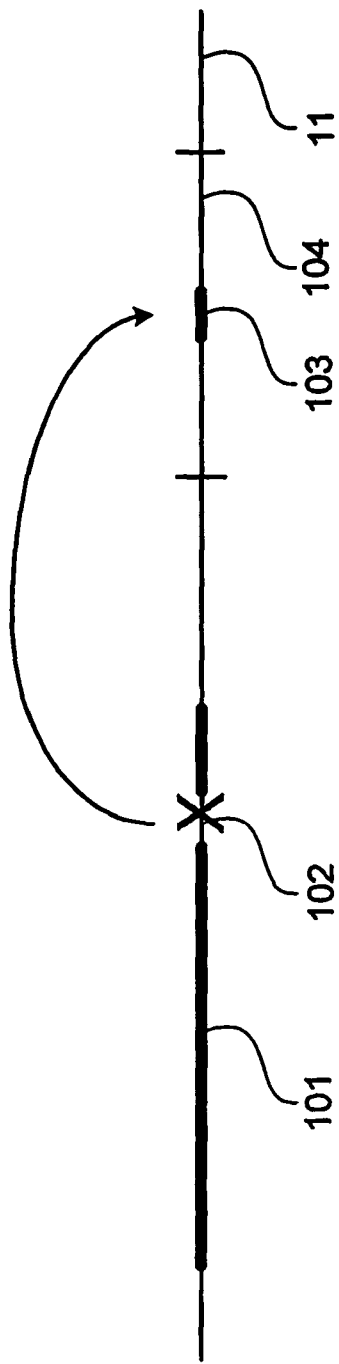
FIG. 4 shows a simple example of a re-recording process, in accordance with the invention.
Figure 4B:
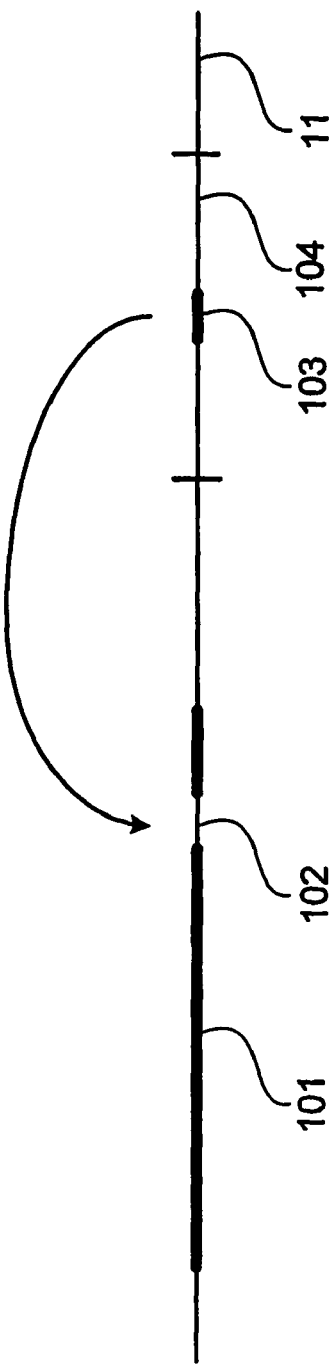

FIG. 4 shows a simple example of a re-recording process according to the invention. In FIG. 4a DVD compliant audio/video data 101 is recorded on a MRW disc with a single defect area 102. During recording this defective location is replaced by a replacement area 103 in the spare area 104. After re-recording is activated, a recorder reads remapped data from position 103 and then attempts to record this data at its original location 102, as shown in FIG. 4b.

This functionality of the control unit 20 is based on the following observation. The MRW standard was defined with computer data applications in mind, where data integrity is of the utmost importance. According to the defect management rules, user data is stored at a replacement location in the spare area instead of a particular (defective) location, if a device can't be sure that a write process at this location will be successful. The same happens if write/read quality at the particular location is less than optimal to assure correct reading/writing at later stage in the device itself or in any other PC or CE device, which may be used for reading/writing this disc in the future. However, data recorded at the defective location may still be of a quality good enough for less sensitive applications, like in case of audio/video data. Moreover, rewriting information at the particular location might still be successful after the replacement is executed, for example as a result of using alternative recording parameters (write strategy, laser power, servo tracking settings or simple retry strategies). Also, the defective location might be readable giving no or less errors when read by a different device (e.g. by the CE device).

In an embodiment, the control unit 20 is adapted to collect information related to re-recording of the user data, read from the replacement location, at the corresponding original (defective) location. This information is than included in the defect table and recorded on the medium. It should comprise at least a flag indicating that the defective location was recorded with the user data from the corresponding replacement location.

In another embodiment, the control unit 20 is capable to verify results of re-recording the user data in the defect area (location). After the user data is re-recorded in the defect area, it is read from the defect area and compared with the user data read from the replacement area. The result of this comparison is included in the information related to re-recording.

In the process of rewriting the replaced user data at the defective location, the MRW defect table is involved. For example, the various status bits in the defect table can indicate one of the following situations:

Status 1
valid replacement of the user data;
a defective area that has not been recorded at it's replacement area;
a "free" entry, i.e. a replacement area useable for future replacement;
a replacement area unusable for future replacement.

Status 2
the original (defective) area has been recorded with the same data as the replacement area or the original area contains the most recently written information (represented by binary xx00 according to the DVD+MRW specification);
the original area may contain different data as the replacement area corresponding to it (represented by binary xx01 according to the DVD+MRW specification).

After re-recording the user data from the replacement location at the original location, following cases, given as examples, can be indicated in the defect table (e.g. by using binary xx01 for Status 2 of the related entry in the defect table):
a case when such re-recording operation has been done, but no guaranties can be given with respect to quality of read-out performed by the receiving CE (other) device;
a read-out check by the MRW device after re-recording has given sufficient good results. In this case the MRW device may assume that next time the defective location is still readable and the replacement is a "preventive step" taken in order to recover the user data when the defective location gives problems, e.g. due to wear;
it is expected that a read-out by CE devices will provide good data and the replacement is a "preventive step" taken in order to recover the user data when the defective location gives problems, e.g. due to wear;
any other definition of strategy optimal for specific classes of devices or content types as described by the user, host or device, optimizing capability to stream the content in a specific environment.

In an embodiment, the control unit 20 is capable of setting in the defect table status bits related to the defect area and the replacement area corresponding to it, representing one or more of the cases defined above.

The entire process of re-recording the remapped data in the original area can be employed as one of actions started with the "make convergent button". As an example, this "button" can be a part of a special application in the PC environment executed after recording of DVD compliant video on the disc; the application that makes the DVD+MRW disc with its content playable in the (legacy) CE environment.

The re-recording process can be performed also in a CE DVD+MRW recorder, i.e. the CE recorder with the MRW capability. Also, it can be performed immediately after recording of new audio/video data on a medium or at a later point in time, possibly by another recorder/device. The advantage of performing the re-recording at the later point in time is that it can lead to good data in the original (defective) area because meanwhile fingerprints or dust might be removed from the medium or the another recorder has better recording capabilities for the medium.

In an embodiment of the recording apparatus, the control unit 20 is adapted to determine whether the re-recording can be done immediately while continuing recording of more data or after the recording has been completed. In the latter case, the control unit 20 can be modified to keep data to be re-recorded in a memory.

It is noted that the apparatus as shown in FIG. 2 has recording and reproducing functions. Alternatively a reading apparatus for only retrieving information from a recording medium contains the scanning elements and the read processing circuitry, but does not have the input unit 27, the formatter 28 and the modulator 29. Its control unit 20 does not perform functions related to recording.

After re-recording, the data comprised in the defective area may give errors during reading. In case of a stream of digital audio/video signals, this will result in "hicks" or strong artifacts in the content-stream noticeable to a user, unless a reading device is knowledgeable enough to take the right optimal decision to read the data from the replacement area instead of the defective area. This can be achieved by devices, which are capable of reading the MRW defect table and interpreting its content. Another way is to assure that the reading device can handle file system based features that allow for pointing to the replacement location instead of the original location in the CE device readable file system, for example using a remapper driver from GAA. In an embodiment, these functionalities are implemented in the control unit 20.

The outputting of the stream of digital audio/video signals by the output unit of the read processing unit 30 is carried out under control of the control unit 20. In particular, the control unit 20 can be adapted to monitor a speed (a data rate) of the outputting in order to maintain continuous supply of data according to requirements defined by a specific application. For example, in DVD recording with the DVD+RW media the following data rates are commonly used:

| Recording Modes | | | |
|---|---|---|---|
| | Recording time (minutes) | Resolution PAL | Resolution NTSC | Average bitrate (Mbits/sec) |
| HQ | 60 | 720 × 576 (Full D1) | 720 × 480 (Full D1) | 9.72 |
| SP | 120 | 720 × 576 (Full D1) | 720 × 480 (Full D1) | 5.07 |
| SP+ | 150 | 720 × 576 (Full D1) | 720 × 480 (Full D1) | 4.06 |
| LP | 180 | 360 × 576 (Half D1) | 360 × 480 (Half D1) | 3.38 |
| EP | 240 | 360 × 576 (Half D1) | 360 × 480 (Half D1) | 2.54 |
| EP+ | 360 | 360 × 576 (Half D1) | 360 × 480 (Half D1) | 1.70 |
| 8 h | 480 | 352 × 288 (SIF) | 352 × 240 (SIF) | 1.27 |

In an embodiment, the control unit 20 is adapted to monitor the speed of outputting the read digital audio/video signals, to read the defect table from the medium, to search the defect table for a replacement area address of a replacement area comprising the user data, to search the defect table for a defect area address of a defect area corresponding to the replacement area and to read the user data either from the replacement area or from the defect area corresponding to the replacement area in dependence on monitoring and speed requirements for the speed of outputting the read digital audio/video signals. Matching of a streaming capability with requirements of a specific application is done by optimizing scheduling of reading and outputting operations and/or employing a cache memory for temporary storage of data read from the medium. Accordingly, the control unit 20 decides to read the user data either from the defect location or its corresponding replacement location.

It should be pointed out that reading data from the replacement location usually requires additional movements of the head 22, thus it introduces delays in supplying the data to the read processing unit 30. In an embodiment, the control unit 20 accounts for these delays while matching the streaming capability.

Advantageously, the control unit 20 is adapted to use the information related to re-recording—comprised in the defect table—for taking decision on using replacement areas versus original areas. For example, the control unit 20 can employ different status bits as explained above. In particular, the control unit 20 can decide to read data from the replacement area, if the information related to re-recording indicates that no guaranties can be given with respect to quality of data in the original area.

In an embodiment, the recording apparatus is arranged as a drive unit to be connected to a separate host system, for example a drive unit to be build in a PC. The control unit 20 is arranged to communicate with a processing unit in the host system via a standardized interface.

In an embodiment of a computer data system comprising the host system and the recording apparatus, the processing unit in the host system is adapted to control the control unit 20 to perform methods and functions as described in reference to embodiments of the recording apparatus presented above.

A computer program product according to the invention is operative to cause the control unit 20 or the processing unit to perform methods and functions as described in reference to embodiments of the recording apparatus presented above.

Whilst the invention has been described with reference to preferred embodiments thereof, it is to be understood that these are not limitative examples. Thus, various modifications may become apparent to those skilled in the art, without departing from the scope of the invention, as defined by the claims. Further, the invention lies in each and every novel feature or combination of features described above. Also, for the storage medium an optical disc has been described, but other media, such as a magneto-optical disc or magnetic tape, can be used. It is noted, that the invention may be implemented by means of a general purpose processor executing a computer program or by dedicated hardware or by a combination of both, and that in this document the word "comprising" does not exclude the presence of other elements or steps than those listed and the word "a" or "an" preceding an element does not exclude the presence of a plurality of such elements, that any reference signs do not limit the scope of the claims, that "means" may be represented by a single item or a plurality and that several "means" may be represented by the same item of hardware.

The invention claimed is:

1. A recording apparatus for recording digital audio/video signals on a removable rewritable disc like recording medium, the medium comprising a user area comprising user data represented by the digital audio/video signals, a table area comprising a defect table, the defect table comprising a list of addresses of defect areas in the user area and corresponding replacement areas on the medium, the defect areas identified as defective according to predefined defect management rules, the recording apparatus comprising input means for receiving the digital audio/video signals;
recording means for recording the digital audio/video signals on the medium;
reading means for reading digital audio/video signals recorded on the medium;
output means for outputting the digital audio/video signals read; and
control means for controlling recording the digital audio/video signals, wherein the control means are adapted to search the defect table for a replacement area address of a replacement area comprising the user data, to search the defect table for a defect area address of a defect area corresponding to the replacement area, to localize the replacement area according to the replacement area address, to localize the corresponding defect area according to the defect area address, to read the user data from the replacement area, and to re-record the user data read in the defect area regardless of whether either of the defect area is indicated as defective or the defect area is defective.

2. The recording apparatus as claimed in claim 1, wherein the control means are adapted to collect re-recording information related to the re-recording of the user data read in the defect area, and to include the re-recording information in the defect table and to record the defect table in the table area.

3. The recording apparatus as claimed in claim 2, wherein the control means are adapted to read user data re-recorded in the defect area, to compare the user data read from the defect area with the user data read from the corresponding replacement area, and to include results of comparing in the re-recording information.

4. The recording apparatus as claimed in claim 2, wherein the control means are adapted to use status bits in the defect table to include the re-recording information in the defect table.

5. A reading apparatus for reading digital audio/video signals from a removable rewritable disc like recording medium, the medium comprising a user area comprising user data represented by the digital audio/video signals, a table comprising a defect table, the defect table comprising a list of addresses of defect areas in the user area and corresponding replacement areas on the medium, the reading apparatus comprising reading means for reading digital audio/video signals recorded on the medium;
output means for outputting the digital audio/video signals read;
control means for controlling reading the digital audio/video signals, wherein the control means are adapted to monitor a speed of outputting the digital audio/video signals read, to read the defect table from the medium, to search the defect table for a replacement area address of a replacement area comprising the user data, to search the defect table for a defect area address of a defect area corresponding to the replacement area, and to read the user data either from the replacement area or from the defect area corresponding to the replacement area in dependence on monitoring and speed requirements for the speed of outputting the digital audio/video signals read regardless of whether either of the defect area is indicated as defective or the defect area is defective.

6. The reading apparatus as claimed in claim 5, the defect table comprising re-recording information related to the user data in the defect area and the replacement area, wherein the control means are adapted to read the user data either from the replacement area or from the defect area in dependence on the re-recording information.

7. A method of arranging digital audio/video signals on a removable rewritable disc like recording medium, the medium comprising a user area comprising user data represented by the digital audio/video signals, a table area comprising a defect table, the defect table comprising a list of addresses of defect areas in the user area and corresponding replacement areas on the medium, the defect areas identified as defective according to predefined defect management rules, the method comprising acts of:
   searching the defect table for a replacement area address of a replacement area comprising the user data;
   searching the defect table for a defect area address of a defect area corresponding to the replacement area;
   localizing the replacement area according to the replacement area address;
   localizing the corresponding defect area according to the defect area address;
   reading the user data from the replacement area; and
   re-recording the user data read in the defect area regardless of whether either of the defect area is indicated as defective or the defect area is defective.

8. The method as claimed in claim 7, characterized by collecting re-recording information related to re-recording of the user data read in the defect area;
   including the re-recording information in the defect table;
   recording the defect table in the table area.

9. The method as claimed in claim 8, comprising acts of:
   reading user data re-recorded in the defect area;
   comparing the user data read from the defect area with the user data read from the corresponding replacement area; and
   including results of comparing in the re-recording information.

10. The method as claimed in claim 8, comprising an act of using status bits in the defect table for including the re-recording information in the defect table.

11. A method of reading digital audio/video signals from a removable rewritable disc like recording medium, the medium comprising a user area comprising user data represented by the digital audio/video signals, a table area comprising a defect table, the defect table comprising a list of addresses of defect areas in the user area and corresponding replacement areas on the medium, the method comprising acts of:
   reading the digital audio/video signals from the recording medium;
   outputting the digital audio/video signals read for processing;
   monitoring a speed of outputting the digital audio/video signals read;
   reading the defect table from the medium;
   searching the defect table for a replacement area address of a replacement area comprising the user data;
   searching the defect table for a defect area address of a defect area corresponding to the replacement area; and
   reading the user data either from the replacement area or from the defect area corresponding to the replacement area in dependence on the monitoring and speed requirements for the speed of outputting the digital audio/video signals read regardless of whether either of the defect area is indicated as defective or the defect area is defective.

12. The method as claimed in claim 11, the method comprising acts of
   re-recording information related to the user data in the defect area and the replacement area; and
   reading the user data either from the replacement area or from the defect area in dependence on the re-recording information.

13. A computer data system comprising a computer connected to a recording apparatus for recording digital audio/video signals on a removable rewritable disc like recording medium, the medium comprising a user area comprising user data represented by the digital audio/video signals, a table area for recording a defect table comprising a list of addresses of defect areas in the user area and corresponding replacement areas on the medium, the defect areas identified as defective according to predefined defect management rules, the recording apparatus comprising:
   input means connected to the computer for receiving the digital audio/video signals;
   recording means for recording the digital audio/video signals on the medium;
   reading means for reading digital audio/video signals recorded on the medium;
   output means for outputting the digital audio/video signals read to the computer; and
   control means for controlling recording the digital audio/video signals, wherein the computer is adapted to control the control means to:
   search the defect table for a replacement area address of a replacement area comprising the user data;
   search the defect table for a defect area address of a defect area corresponding to the replacement area;
   localize the replacement area according to the replacement area address;
   localize the corresponding defect area according to the defect area address;
   read the user data from the replacement area; and
   re-record the user data read in the defect area regardless of whether either of the defect area is indicated as defective or the defect area is defective.

14. A non-transitory computer program stored on a computer readable memory medium for arranging digital audio/video signals on a removable rewritable disc like recording medium, the medium comprising a user area comprising user data represented by the digital audio/video signals, a table area comprising a defect table, the defect table comprising a list of addresses of defect areas in the user area and corresponding replacement areas on the medium, the defect areas identified as defective according to predefined defect management rules, wherein the program is operative to cause a processor to perform acts of: searching the defect table for a replacement area address of a replacement area comprising the user data; searching the defect table for a defect area address of a defect area corresponding to the replacement area; localizing the replacement area according to the replacement area address; localizing the corresponding defect area according to the defect area address; reading the user data from the replacement area; and re-recording the user data read in the defect area regardless of whether either of the defect area is indicated as defective or the defect area is defective.

* * * * *